W. R. WARING.
LOADING MACHINE.
APPLICATION FILED AUG. 13, 1909.
1,039,339.
Patented Sept. 24, 1912.
6 SHEETS—SHEET 1.
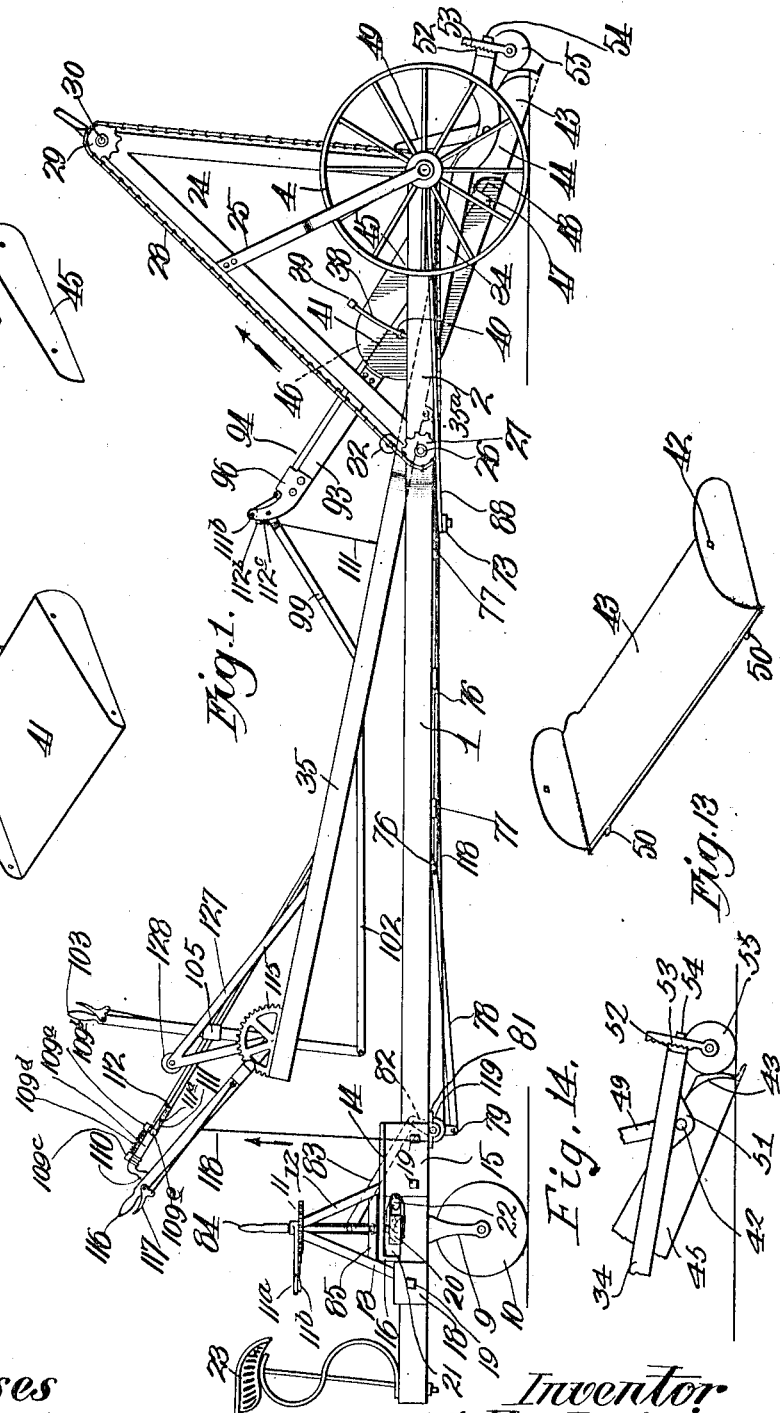
Witnesses
Frank P. Glon
H. C. Rodgers.
Inventor
Walter R. Waring.
By George F. Lorph Atty.

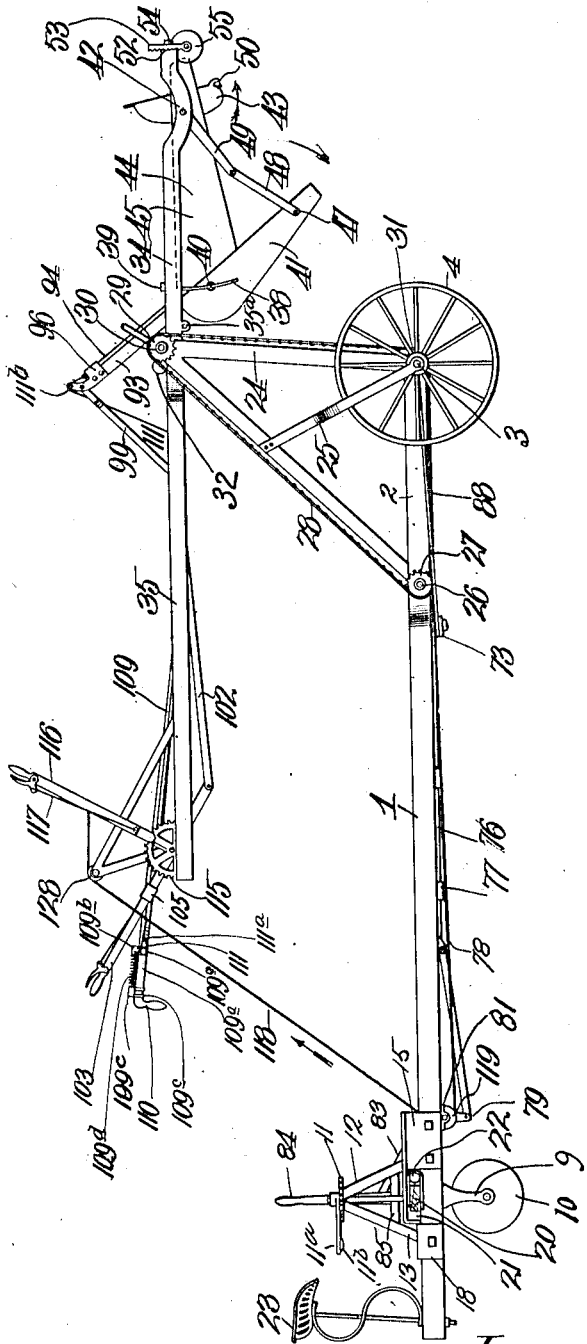

W. E. WARING.
LOADING MACHINE.
APPLICATION FILED AUG. 13, 1909.
1,039,339.
Patented Sept. 24, 1912.
6 SHEETS—SHEET 3.
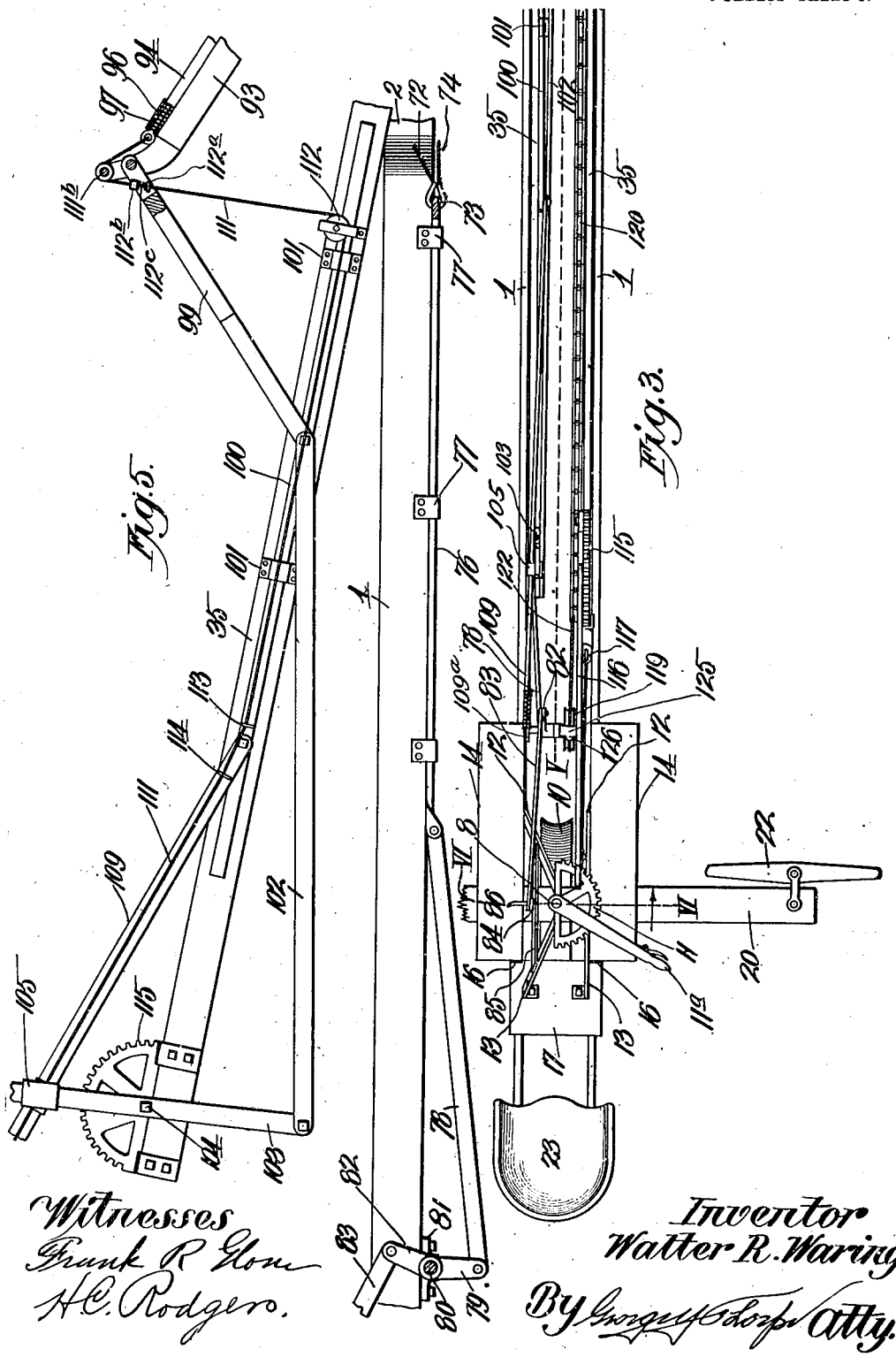

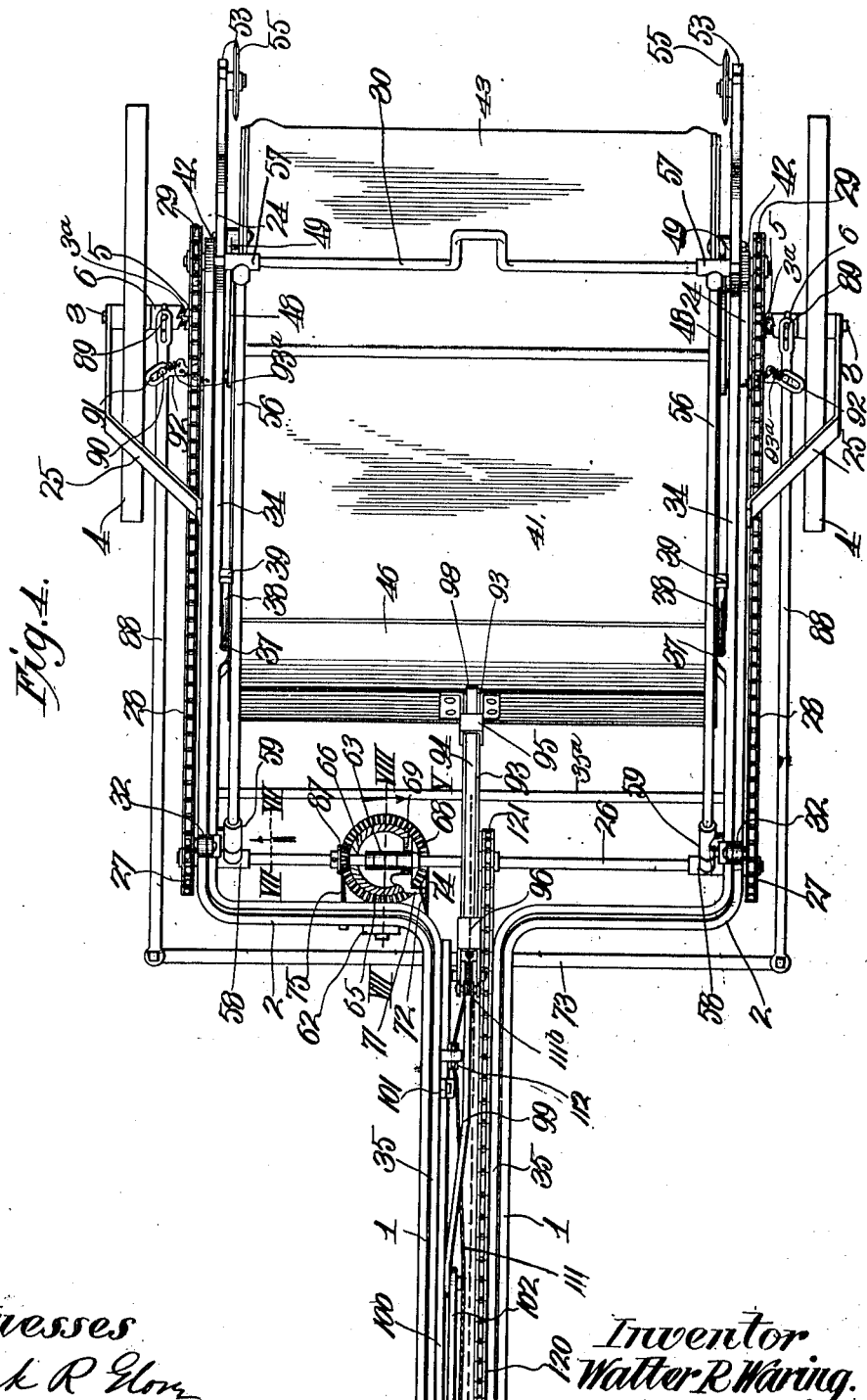

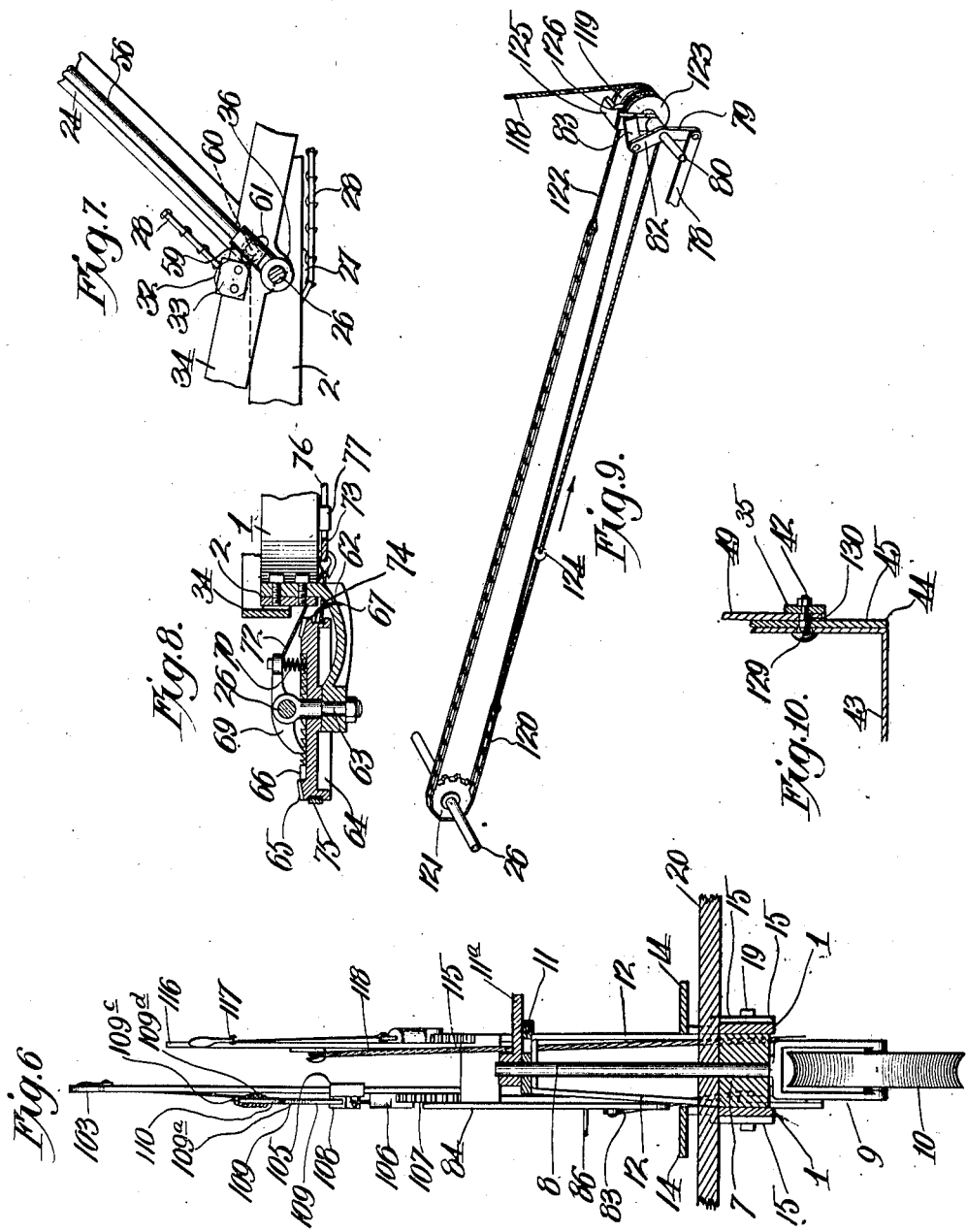

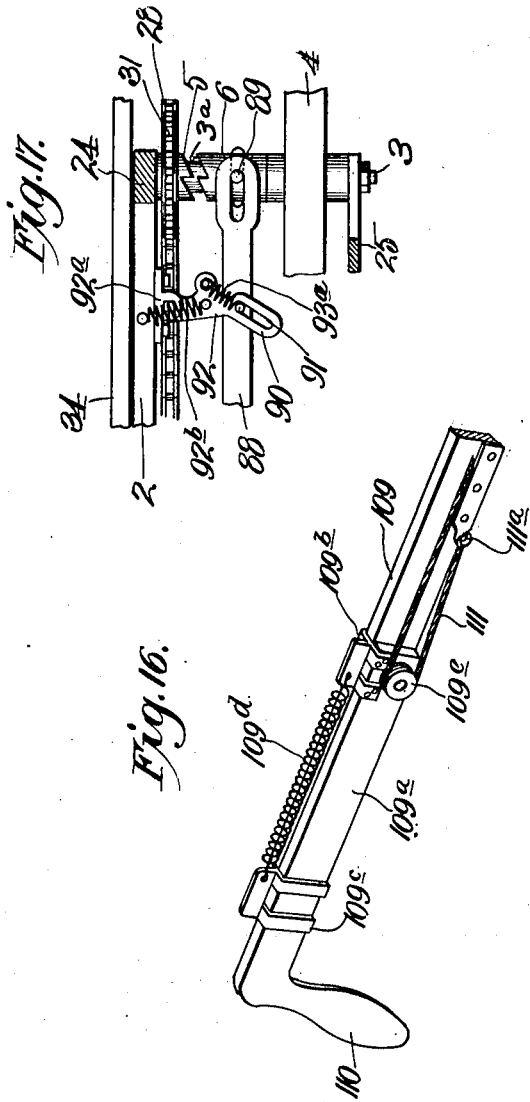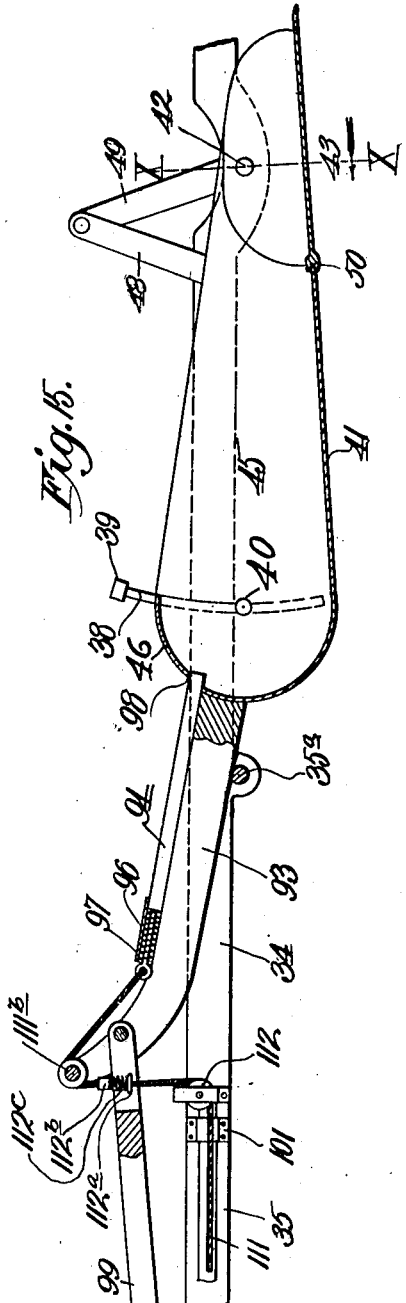

UNITED STATES PATENT OFFICE.

WALTER R. WARING, OF WAVERLY, KANSAS.

LOADING-MACHINE.

1,039,339.    Specification of Letters Patent.    Patented Sept. 24, 1912.

Application filed August 13, 1909. Serial No. 512,744.

*To all whom it may concern:*

Be it known that I, WALTER R. WARING, a citizen of the United States, residing at Waverly, in the county of Coffey and State of Kansas, have invented certain new and useful Improvements in Loading-Machines, of which the following is a specification.

This invention relates to loading machines and more especially to machines of that type embodying an adjustable scraper for gathering up material from the ground and dumping it into a wagon or other receptacle, and my object is to produce an efficient and reliable machine of this character which can be easily and reliably controlled by the driver.

With these objects in view and others as hereinafter appear, the invention consists in certain novel and peculiar features of construction and organization as hereinafter described and claimed; and in order that it may be fully understood reference is to be had to the accompanying drawings, in which:

Figure 1, is a side elevation of a machine embodying my invention, arranged in position to gather material from the ground. Fig. 2, is a side elevation on a smaller scale, with the parts in the position occupied as the material is dumped into a wagon or other receptacle. Figs. 3 and 4 together constitute an enlarged plan view of the machine with the parts arranged as in Fig. 1. Fig. 5, is a section on the line V—V of Figs. 3 and 4. Fig. 6, is a vertical section on the line VI—VI of Fig. 3. Fig. 7, is an enlarged vertical section on the line VII—VII of Fig. 4. Fig. 8 is an enlarged vertical section on the line VIII—VIII of Fig. 4. Fig. 9, is a detail perspective view of a part of the hoisting mechanism. Fig. 10, is a vertical section taken on the line X—X of Fig. 15. Figs. 11, 12 and 13 are detail perspective views of parts of the scraper. Fig. 14 is a fragmentary side view of a modified form of the scraper-carrying frame. Fig. 15, is an enlarged central vertical section of the scraper when it and its carrying-frame are adjusted to a substantially horizontal position preliminary to their elevating and dumping operations. Fig. 16, is an enlarged detail perspective view of a two-part lever forming a part of the invention. Fig. 17, is an enlarged detail to more clearly disclose the wheel clutches and the mechanism for operating the same.

In the said drawings, a wheeled frame is constructed as follows—1 indicates a pair of parallel bars arranged a short distance apart and a suitable distance from their front ends bent outwardly and forwardly so as to constitute a wide fork 2, provided at their front ends of its arms with outwardly-projecting stub-shafts 3 upon which are journaled sleeves 3ª upon which are rigidly secured carrying wheels 4, said sleeves being equipped with loose clutch members 5 and slidable clutch members 6 which turn with the carrying wheels. The slidable clutch members 6 are feather-keyed to the sleeves 3ª, as common in clutch construction. Near their rear ends bars 1 carry an interposed block 7 in which is swiveled the vertical stem 8 of a fork 9 equipped with a steering wheel 10.

11 is a notched sector in which the upper end of stem 8 is journaled and secured to the upper end of said stem is a steering lever 11ª provided with a latch 11ᵇ for engagement with the sector. Sector 11 is mounted upon the upper end of an arched frame constructed as follows: 12 and 13 are pairs of bars secured at their upper ends in any suitable manner to the sector and extending divergingly downward therefrom, bars 12 being secured at their lower ends to the depending side portions 15 of a pair of platforms 14 arranged at opposite sides of said stem, said portions 15 resting upon and fitting against the outer sides of the bars 1. At their rear ends the platforms are provided with depending portions 16 integrally united with a cross-piece 17, to which the lower ends of the pair of bars 13 are secured. Cross piece 17 is provided with depending portions 18 fitting against the outer sides of bars 1, the portions 15 and 18 being secured by suitable bolts 19 to the bars 1.

20 is a double-tree pivoted on stem 8 and extending through the openings 21 formed by and between the bars 1 and the platforms 14 and equipped at their ends with swingletrees 22, and mounted on the rear end of bars 1 is a seat 23. 24 is a pair of vertical frames secured upon the fork-arms 2 of the said wheeled frame and said frames are braced by bars 25 extending downwardly and outwardly and receiving and forming braces for the stub-shafts 3. 26 is a transverse shaft journaled in the forked-end of said frame, and secured rigidly on the outer ends of said shaft are sprocket wheels 27 connected by endless sprocket chains 28 with sprocket wheels 29 secured on the ends of a transverse shaft 30 journaled in the upper ends of the frames 24 and sprocket wheels 31 journaled on the clutch-members 5 and rigid with said clutch members, and carried by sprocket chains 28 are rollers 32 to travel upwardly and downwardly upon the hypotenuse sides of the angular frames 24, plates 33 movable with the chains and located at the inner sides of frames 24, being secured as shown in Fig. 7, to the arms 34 of a forked-frame capable of fitting snugly within the forked-end of said wheeled-frame when the machine is performing its gathering function as hereinafter more particularly referred to, the said forked-frame embodying a handle consisting of a pair of arms 35 fitting snugly between bars 1 when the arms 34 fit snugly within the forked-end of the wheeled-frame.

In the gathering operation the inner forked-frame occupies the position shown in Fig. 1, the arms 34 being equipped with recessed lugs 36 pivotally engaging the shaft 26. Said arms are also provided with recessed lugs 37 through which extend upwardly and forwardly curved rods 38 provided with heads 39 at their upper ends and pivoted at 40 to and arranged at the outer sides of the rear member 41 of the scraper, said rods 38 curving concentrically with respect to the pivots 42 connecting the front member 43 of the scraper with the arms of the inner fork. The intermediate member 44 of the scraper has no bottom and forms a link pivotally uniting the front and rear members, arms 45 of said link fitting snugly within the rear member to which they are pivoted at 40, and embracing the front member and the cross-piece 46 of said intermediate member or link and being adapted to fit within the curved rear or back portion of member 41 when the dumping action occurs, and pivotally connecting member 41 at 47 to the pivots 42 of member 43 are toggles, consisting of bars 48 and 49, it being noticed that the arms of the intermediate member are mounted on the said pivots 42. The member 43 has rearwardly-projecting lips 50 to underlie the front end of the bottom of member 41 and the rear end of the bottom of member 43 is adapted to slightly overlap the front end of the bottom of the member 41 and thus more effectually guard against any of the material gathered up, working through the joint formed by the overlapping ends of the bottom of said members when the scraper is closed, that is to say, in position to gather up material.

By reference to Fig. 1 particularly, it will be noticed that the arms 34 of the inner forked-frame are curved downward or depressed to permit the pivots 42 to be disposed sufficiently low to insure the depression of the front end of member 43 sufficiently to properly perform its gathering function, though it is obvious that a change of proportion of the parts could be made whereby it would be unnecessary to depress said arms, or the latter could be equipped with depending portions or hangers 51 to accomplish the same purpose, as shown in Fig. 14. The front ends of the arms 34 of the inner forked-member are corrugated at 52 for engagement by the corrugated bars 53 secured thereto by bolts 54 and equipped with colters 55 for making parallel incisions in the ground in approximately the plane of the sides of the scraper, to facilitate the gathering function of the latter, said colters furthermore serving to sever corn stalks, twigs and the like which may lie partly in the path of the machine and therefore tend to render the gathering function more difficult.

56 indicates a pair of bars arranged parallel with and slightly inward of the hypotenuse sides of the frames 24 and secured at their upper ends to sleeves 57 on shaft 30 and at their lower ends to sleeves 58 on shaft 26, and slidingly mounted on bars 56 are sleeves 59 provided with outwardly-projecting pins 60 engaging slots 61 in the arms of the inner fork, said slots curving concentrically of shaft 26, and being provided to accommodate a rocking or pivotal movement of the inner forked-frames on shaft 26. The rollers 32 which also rock with said forked-frame may bear a fixed relation thereto because there will be sufficient slack in chains 28 to accommodate the rocking movement of the rollers.

62 is a bracket secured to and projecting forward from one arm of the forked-end of the wheeled-frame, and journaled on an eye-bolt 63 carried by said bracket is a wheel 64 provided with beveled cog-teeth 65, ratchet-teeth 66 and a peripheral groove 67, and pivoted on the shaft 26 between said eye-bolt and a collar 68 on said shaft, is a pawl 69 held by a spring 70 interposed between said pawl and the wheel, in engagement with the ratchet-teeth, said pawl being provided with a laterally-projecting arm 71 connected by a cable 72 to a cross-bar 73 underlying bars 1, the said bar 73 being also connected by a cable 74 with one end of a brake-strap 75 engaging the peripheral groove 67 of wheel 64, and attached at its opposite end to the wheeled-frame.

The cross bar 73 is connected in any suitable manner to the front end of a longitudinal bar 76 mounted slidingly in guides 77 secured to one of the bars 1 and pivotally connected at its rear end by a link 78 to the depending crank arm 79 journaled on a stationary shaft 80 carried by brackets 81 secured to bars 1, adjacent to the platform 14.

82 is an upwardly-projecting crank arm movable with crank arm 79 and pivotally connected by a link 83 to the lever 84 pivoted on a cross bar 85 connecting one of the bars 12 with one of the bars 13, said lever having a laterally-projecting foot-piece 86 so that it may be operated by foot if desired. By swinging said lever forward the cross-bar is moved rearward and through cables 72 and 74 disengages the pawl from the ratchet-wheel and applies the brake to guard against rotation of wheel 64, the cog-teeth of said wheel meshing with the bevel gear 87 secured upon shaft 26. The rearward movement of bar 73 at the same time imparts like movement to the longitudinal links 88 having pin-and-slot connections 89 with the slidable clutch-members 6, and to compel said clutch-members to move outward from engagement with the inner clutch-members 5, the links 88 are provided with pins 90 engaging slots 91 in a pair of swing-plates 92 pivoted to bearings 92ª carried by the fork arms of the wheeled-frame, retractile springs 93ª connecting said plates with said pins 90 for the purpose of normally holding the front ends of links 88 at the inner ends of slots 91, so that the swinging movement of said plates 92 shall result in sliding the clutch-members 6 in or out as the case may be. The slots 91 are provided in order to permit the links 88 to swing outward independent of pivoted plates 92 in backing the machine, as in such action the beveled faces of the teeth of the clutch-members will result in outward movement of the slidable clutch-members. It will thus be seen that when lever 84 is pulled back the clutch-members 6 move into engagement with clutch-members 5 so as to be capable of transmitting motion from wheels 4 to the sprocket wheels 31 and hence chains 28. At the same time the pawl is permitted to engage the ratchet-teeth of wheel 64 and the brake-strap 75 is relaxed and as a result the inner forked-frame and the scraper carried thereby, start to move upward and forward, the rollers 32 guiding such movement by traveling on the track afforded by the rear edges of the hypotenuse sides of frames 24. To hold the slidable clutch-members 6, out of engagement with clutch-members 5, retractile springs 92ᵇ connect the plates 92 with the fork arms 2 (see Fig. 17) and exert a rearward pull on plates 92. Said springs 92ᵇ also tend to hold the clutches together when engaged by exerting an inward pull on plates 92 forward of their pivotal points when said plates have been swung forward by the links 88.

93 is a handle projecting rearwardly from the rear end of member 41 of the scraper and 94 is a latch bar mounted slidably upon said handle in keepers 95 and 96, a spring 97 being arranged within the keeper 96 to hold the latch bar yieldingly in engagement with the notch 98 in the lower edge of the cross-piece 46 of member 44 of the scraper, for the purpose of locking the rear member of the scraper from swinging upwardly at its rear end around pivotal point 40. The rear end of said handle is connected pivotally by a link 99 to slide-bar 100 mounted in keepers 101 carried by one of the bars 35, and said slide bar is pivotally connected by a link 102 with the lower end of a lever 103 fulcrumed at 104 on bars 35, said lever carrying a slidable sleeve 105 forming a part of a latch mechanism 106 engaging a sector 107 mounted upon one of the bars 35. 108 is a sleeve pivotally carried by sleeve 105 and slidably receiving a lever 109 pivoted to slide bar 100, and adapted for endwise movement mainly, and for pivotal movement when it is desired to disengage the latch mechanism from the sector 107, this pivotal movement resulting in imparting endwise movement to the sleeve 105. It will thus be seen that the lever 103 can be unlocked from the sector 107 by either the usual manipulation of the latch mechanism or by swinging the lever 109 upward, and for convenience in manipulating lever 109 it is provided with a bent handle 110 on a slidable extension 109ª, clips 109ᵇ and 109ᶜ holding the extension and lever together, and said clips are connected by a retractile spring 109ᵈ. Clip 109ᵇ carries a guide sheave 109ᵉ around which is trained a cable 111 secured at one end at 111ª to lever 109, its other end being attached to the latch bar 94 (see Figs. 5 and 15). Near its front end it is trained over a guide-sheave 111ᵇ carried by handle 93 and under guide sheave 112 carried by one of the bars 35. Between said guide-sheaves 111ᵇ and 112 the cable extends through an eye 112ª carried by link 99, and above said eye has a fixed collar 112ᵇ to limit its movement downward through said eye. Between sheaves 112 and 109ᵉ the cable extends through guides 113 and 114 carried respectively by bar 100 and lever 109. The function of the cable 111 is hereinafter explained.

115 is a notched sector mounted upon the rear end of one of the bars 35, and pivoted to said sector is a lever 116 provided with a latch mechanism 117 for engagement with the sector, and connected to said lever is a cable 118 extending down and around a sheave 119 carried by bars 1. From said sheave the cable extends forward and is attached at its front end to a sprocket chain 120 trained upon a sprocket wheel 121 secured upon shaft 26, the opposite end of said chain being connected by a cable 122 trained around a second sheave 123, to the lower strand of chain 120, and said cable 122 is provided with a button or collar 124 for a purpose which hereinafter appears, the sheaves 119 and 123 being journaled on the stationary shaft 80 hereinbefore referred to, and rotatable on the said shaft with the crank arms 79 and 82 hereinbefore described, is an angular crank arm 125 provided with a lip 126 disposed in the path of movement of the button or collar so as to be operated at times by the same. 127 is a bracket projecting also from one of the bars 35 and equipped with a guide sheave 128 adapted to engage the arched cable 118 when lever 116 is swung forward for a purpose which hereinafter appears.

Assuming that the parts are arranged as shown in Fig. 1, it will be seen that forward movement of the machine results in the scraper gathering up material in its path, it being understood that the clutch members are disengaged at such time and that the pawl is also disengaged and the brake is applied. When the scraper is loaded to the desired extent the operator swings lever 103 forward and through the link 102 slides bar 100 rearward and expands the toggle constituted by the scraper handle 93 and link 99, the scraper swinging downward on pivot 42 until substantially parallel with the inner forked frame at this time in an inclined position, when as will be seen by reference to Fig. 15, the handle 93 rests upon a cross-rod 35$^a$ carried by the fork arms 34 and the collar 112$^b$ rests on spring 112$^c$ which offers a resistance to compression greater than the loaded scraper to tilting movement in order to prevent the withdrawal of the latch-bar 94 from notch 98, and that the spring 109$^d$ holds the cable back of spring 112$^c$ under tension. At the same time or immediately after lever 103 is swung forward, lever 116 is swung forward and tends to move cable 118 in the direction indicated by the arrows Figs. 1, 2 and 9, but as said cable is incapable of moving because of the preponderating resistance offered by the inner forked frame and scraper through the chains 28, sprockets 27, shaft 26, sprocket 121 and chain 120, the inner forked frame and the scraper are rocked to a substantially horizontal position, it being understood in this connection that this result would not be possible in the construction and proportion of the parts shown, except through the arching of cable 118 by the guide-sheave 128. The operator next pulls lever 84 rearward, and through link 83, crank arms 82 and 79 and link 78, slides bar 76 forward and thus causes the cross bar 73 and the links 88 to move in the same direction, said links 88 through the instrumentality of the pivoted plates 92 being swung inwardly at their front ends to cause the clutch members 6 to interlock with the clutch members 5 in which position they are yieldingly held by springs 92$^b$. At the same time as hereinbefore explained, the tension of the brake on wheel 64 relaxes by the forward movement of bar 73 and the pull of cable 72 on the pawl is relaxed to permit the latter to be caused by spring 70 to interlock with the ratchet wheel to guard against back rotation of wheel 64. As these results are effected, the forward movement of the machine operates the chains 28 as hereinbefore explained, and raises the inner forked frame and scraper until they attain the position shown in Fig. 2, it being understood that in this operation the cable 118 is paid out to permit the said forked frame and scraper to be raised by the operation of chain 120 through the turning of shaft 26 by the sprocket chains 28, and that the cable 118 maintains sufficient downward pressure on sheave 128 to counterbalance the weight of the loaded scraper, and that as said frame and scraper attain the position shown in Fig. 2, the button or collar 124 strikes the lip of the angular crank arm 125 and swings the latter forwardly and thus imparts rearward movement to cross-bar 73 through the connections described, and outward movement to the front ends of the links 88 and thereby causes the same to slide clutch-members 6 outward from engagement with clutch-members 5, so that the machine may proceed to the dumping point without further operation of the scraper or danger of the same and the inner forked frames sliding downward on the frames 24 because such parts are locked in their elevated positions by the pawl and ratchet mechanism, it being understood in this connection that the said outward movement of the clutch members is insufficient to disengage the pawl or apply the brake. When the dumping point is reached the operator pulls rearward on handle 110 to slide the lever extension 109$^a$ rearward on lever 109 and through the cable 111 and button 112$^b$ effect compression of spring 112$^c$ and withdraw latch bar 94 from the notch in the lower edge of the cross-piece of the intermediate member of the scraper. He then permits said lever 109 to slide forward and the said toggle to be contracted, by the weight of the load in the scraper, the instant the intermediate member is unlocked, and thus leave the member 41 free to swing downward until arrested by the engagement of heads 39 of rods 38, with the lugs 37, and through the toggle composed of bars 48 and 49 swing the front member of the scraper in the direction indicated by the adjacent arrow, Fig. 2, from the relative position shown in Fig. 1 to that shown in Fig. 2, it being apparent (see Fig. 10) that this effect is obtained because pivots 42 are journaled in the arms of the forked frame and the arms of the intermediate or link member of the scraper and are provided with angular portions 129 and 130, respectively fitting non-rotatably in the front member of the scraper and the bars 49 of said toggles.

Immediately the latch is withdrawn and the dumping action of the scraper takes place, a forward pull is imposed on cable 111, and to accommodate this pull spring 109$^d$ is provided, that is to say it yields under the tilting action of the scraper to provide the necessary slack in said cable to accommodate such action. After the dumping action has been accomplished, the operator grasps and operates lever 109 rearwardly and thus through the instrumentality of cable 111, reëxpands the toggle constituted by the scraper handle 93 and link 99 and restores the scraper members to their normal or closed positions, the handle 93 fulcruming on cross rod 35$^a$ to accomplish this purpose as will be readily understood by reference to Figs. 2 and 15, the upward swinging of the intermediate or link member upon pivots 42 being guided by the upward slidable movement of curved rods 38 in the recessed lugs 37. In this reëxpansion of the toggle sufficient slack occurs between spring 112$^c$ and the latch-bar to permit the weak spring 97 to cause the latch-bar to reëngage the notch 98 and lock the scraper members in operative or closed position. He then operates lever 84 to trip the pawl from engagement with the ratchet wheel teeth 66 and apply the brake upon wheel 64, the clutch members 6 being incidentally compelled to continue their movement away from clutch members 5. The lever 84 is held with sufficient firmness to prevent the inner forked frame and scraper from gravitating downwardly and rearwardly to their original positions too rapidly, as nothing interferes with the descent except the resistance presented by the brake, the bearing lugs 36 reëngaging shaft 26 when the descent is fully accomplished. After the scraper-carrying frame has been arrested in its downward movement by shaft 26, the operator through the instrumentality of levers 103 and 116 tilts the scraper and the inner forked member downward and forward respectively, that is to say, restores them to the position shown in Fig. 1. All future operations are repetitions of those described.

Should it be desired to back the machine without affecting the operation or position of any of the parts, the clutch members 6, are permitted to turn backward and slip over the teeth of the clutch members 5, by the springs 93$^a$ and the pin-and-slot connections of links 88 with the pivoted plates 92, as shown in Fig. 17.

From the above description it will be apparent that I have produced a loading machine embodying the features enumerated as desirable and I wish it to be understood that I reserve the right to make such changes in the form, proportion, detail construction and arrangement of the parts as properly fall within the spirit and scope of the appended claims.

Having thus described the invention what I claim as new and desire to secure by Letters-Patent, is:

1. In a machine of the character described, a scraper comprising a rear member having a bottom, sides and a rear end portion, a front member comprising a bottom and sides, and an intermediate or link member comprising sides fitting snugly within and pivoted to the sides of the rear member and snugly embracing the sides of the front member and provided with a curved cross piece fitting against the inner or front face of the rear portion of the rear member, and toggles connecting the ends of the rear member and front member and adapted to transmit movement from one to the other.

2. In a machine of the character described, a scraper comprising a rear member having a bottom, sides and a rear end portion, a front member comprising a bottom and sides, and an intermediate or link member comprising sides fitting snugly within and pivoted to the sides of the rear member and snugly embracing the sides of the front member and provided with a curved cross piece fitting against the inner or front face of the rear portion of the rear member, and toggles connecting the ends of the rear member and front member and adapted to transmit movement from one to the other, a frame, pivots journaled in said frame, and in the intermediate or link member of the scraper and rigidly secured to the front member and the front bars of said toggles, rods extending concentrically of said pivots and engaging said frame and provided with heads at their upper ends to engage the frame and provided with pivots engaging the sides of the rear member and the intermediate or link member of the scraper, a handle projecting from the rear member of the scraper, and a latch engaging the rear member of the scraper to prevent dumping action thereof.

3. In a machine of the character described, a scraper comprising a rear member having a bottom, sides and a rear end portion, a front member comprising a bottom and sides, and an intermediate or link member comprising sides fitting snugly within and riveted to the sides of the rear member and snugly embracing the sides of the front member and provided with a curved cross piece fitting against the inner or front face of the rear portion of the rear member, and toggles connecting the ends of the rear member and front member and adapted to transmit movement from one to the other, a frame, pivots journaled in said frame and in the intermediate or link member of the scraper and rigidly secured to the front member and the front bars of said toggles, rods extending concentrically of said pivots and engaging said frame and provided with heads at their upper ends to engage the frame and provided with pivots engaging the sides of the rear member and the intermediate or link member of the scraper, a handle projecting from the rear member of the scraper, a latch engaging the rear member of the scraper to prevent dumping action thereof, and means for unlocking the said latch to permit the rear member of the scraper to swing to a downwardly and forwardly inclined position and to move downward bodily until arrested by the engagement of the heads of said rods with the said frame.

4. In a machine of the character described, a scraper comprising a rear member having a bottom, sides and a rear end portion, a front member comprising a bottom and sides, and an intermediate or link member comprising sides fitting snugly within and pivoted to the sides of the rear member and snugly embracing the sides of the front member and provided with a curved cross piece fitting against the inner or front face of the rear portion of the rear member, and toggles connecting the ends of the rear member and front member and adapted to transmit movement from one to the other, a frame, pivots journaled in said frame and in the intermediate or link member of the scraper and rigidly secured to the front member and the front bars of said toggles, rods extending concentrically of said pivots and engaging said frame and provided with heads at their upper ends to engage the frame and provided with pivots engaging the sides of the rear member and the intermediate or link member of the scraper, a handle projecting from the rear member of the scraper, a latch engaging the rear member of the scraper to prevent dumping action thereof, means for unlocking the said latch to permit the rear member of the scraper to swing to a downwardly and forwardly inclined position and to move downward bodily until arrested by the engagement of the heads of said rods with the said frame, and lever actuated means carried by the said frame to restore the scraper members to their original positions.

5. In a machine of the character described, a scraper comprising a rear member having a bottom, sides and a rear end portion, a front member comprising a bottom and sides, and an intermediate or link member comprising sides fitting snugly within and pivoted to the sides of the rear member and snugly embracing the sides of the front member and provided with a curved cross piece fitting against the inner or front face of the rear portion of the rear member, and toggles connecting the ends of the rear member and front member and adapted to transmit movement from one to the other, a frame, pivots journaled in said frame and in the intermediate or link member of the scraper and rigidly secured to the front member and the front bars of said toggles, rods extending concentrically of said pivots and engaging said frame and provided with heads at their upper ends to engage the frame and provided with pivots engaging the sides of the rear member and the intermediate or link member of the scraper, and a latch engaging the rear member of the scraper to prevent dumping action thereof in combination with a supporting frame, and means for tripping the said latch to cause dumping action of the scraper.

In testimony whereof I affix my signature, in the presence of two witnesses.

WALTER R. WARING.

Witnesses:
L. W. WARING,
C. F. MATHIS.